(12) United States Patent  (10) Patent No.: US 8,275,034 B2
Sakamoto  (45) Date of Patent: Sep. 25, 2012

(54) MOVING IMAGE ENCODING APPARATUS AND CONTROL METHOD, AND COMPUTER PROGRAM

(75) Inventor: Daisuke Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1456 days.

(21) Appl. No.: 11/675,215

(22) Filed: Feb. 15, 2007

(65) Prior Publication Data

US 2007/0195886 A1    Aug. 23, 2007

(30) Foreign Application Priority Data

Feb. 21, 2006  (JP) ................................. 2006-044299

(51) Int. Cl.
*H04N 7/12*    (2006.01)
(52) U.S. Cl. .............................. 375/240.12; 375/240.16
(58) Field of Classification Search .................. 375/240, 375/240.12, 240.16
See application file for complete search history.

(56) References Cited

U.S. PATENT DOCUMENTS

| | | | |
|---|---|---|---|
| 2002/0136301 A1* | 9/2002 | Yoneyama et al. | 375/240.13 |
| 2005/0175101 A1* | 8/2005 | Honda et al. | 375/240.16 |
| 2005/0276323 A1* | 12/2005 | Martemyanov et al. | 375/240.03 |
| 2007/0195884 A1 | 8/2007 | Sakamoto | 375/240.16 |

FOREIGN PATENT DOCUMENTS

JP    2005-167720    6/2005

* cited by examiner

*Primary Examiner* — Techane Gergiso
(74) *Attorney, Agent, or Firm* — Fitzpatrick, Cella, Harper & Scinto

(57) ABSTRACT

A moving image encoding apparatus, comprising, a first image transformation unit adapted to transform image data into first image information, with reference to reference image data, a second image transformation unit adapted to inverse transform the first image information into reconstructed image data and a determination unit adapted to determine, based on the image data and the reconstructed image data, whether or not to use the reconstructed image data as the reference image data, wherein the determination unit calculates a peak signal-to-noise ratio (PSNR) from the reconstructed image data and the image data, and, if the PSNR is greater than or equal to a predetermined threshold, determines to use the reconstructed image data as the reference image data.

10 Claims, 4 Drawing Sheets

MOVING IMAGE ENCODING APPARATUS AND CONTROL METHOD, AND COMPUTER PROGRAM

BACKGROUND OF THE INVENTION

1. Field of the Invention

The present invention relates to a moving image encoding apparatus and control method, and a computer program.

2. Description of the Related Art

The digitization of multimedia-related information has accelerated in recent years and has been accompanied by increasing demand for video information of higher image quality. A specific example that can be mentioned is the transition from conventional SD (Standard Definition) of 720×480 pixels to HD (High Definition) of 1920×1080 pixels in broadcast media. However, this demand for higher image quality has led simultaneously to an increase in quantity of data and, as a result, compression encoding techniques and decoding techniques that surpass conventional capabilities have been sought.

In response to such demand, the activities of the ITU-T SG16, ISO/IEC and JTC1/SC29/WH11 have moved forward the standardization of compression encoding techniques using interframe prediction, which utilizes the correlation between images. One of these techniques is H.264/MPEG-4 PART 10 (AVC) (referred to below as "H.264"), which is as an encoding scheme said to implement the most highly efficient encoding available at present. The specifications of encoding and decoding according to H.264 are disclosed in the specification of Japanese Patent Laid-Open No. 2005-167720, by way of example.

One technique newly introduced by H.264 is a technique whereby a reference image used in interframe prediction encoding is selected from among a plurality of images (this shall be referred to as "multiple reference interframe prediction" below).

According to such conventional encoding schemes as MPEG-1, MPEG-2 and MPEG-4 (referred to simply as "MPEG encoding schemes" below), forward-prediction and backward-prediction functions are available in instances where motion prediction is carried out. Forward prediction is a prediction scheme in which an image frame situated later in terms of time is predicted from an image frame situated earlier in terms of time. Backward prediction is a prediction scheme in which an image frame situated earlier terms of time is predicted from an image frame situated later in terms of time. For example, with backward prediction, an image frame that skipped encoding earlier can be predicted based upon the present image frame.

According to forward prediction and backward prediction in this MPEG encoding, often an image immediately before or after an image to undergo processing is used as a reference frame to which reference is made when motion prediction is performed. The reason for this is that in many cases there is a high degree of correlation between the image to be processed and an image that is nearby in terms of time.

With an MPEG encoding scheme, however, there can be occasions where there is a large change between images, as when camera motion such as panning and tilting in shooting moving images is fast or in the case of an image immediately after a cut change. In such cases the correlation between images is small, even with images close together temporally, and there is the possibility that the advantage of motion-compensated prediction cannot be exploited.

One approach that solves this problem is multiple reference interframe prediction employed in H.264. With this prediction scheme, not only a temporally close image but also a temporally distant image is used in a prediction. If it is likely to improve encoding efficiency over that obtained with use of a nearby image, a distant image is utilized as the reference frame.

Thus, with H.264, motion-compensated prediction can be performed by selecting, from a plurality of images, an image for which the error between an input image and an image already encoded is smallest and utilizing the selected image as the reference frame. As a result, when a moving image is subjected to compression encoding, it is possible to achieve efficient encoding even if the motion of a camera shooting a moving picture image is fast or even in a case where a cut change has occurred.

However, if computations for selecting frames for which the error with respect to an input image is small are performed with regard to all images already encoded, the amount of computation increases in proportion to the number of frames referred to and the time required for encoding becomes enormous. Further, in the case of a mobile device such as a video camcorder, an increase in computation load leads to an increase in amount of battery consumption. Consequently, the effect upon available shooting time cannot be ignored.

SUMMARY OF THE INVENTION

Accordingly, the present invention makes it possible to execute motion compensation processing efficiently while reducing the amount of computation for motion compensation in multiple reference interframe prediction.

The present invention according to one aspect of preferable embodiments relates to a moving image encoding apparatus, comprising, a first image transformation unit adapted to transform image data into first image information, with reference to reference image data, a second image transformation unit adapted to inverse transform the first image information into reconstructed image data and a determination unit adapted to determine, based on the image data and the reconstructed image data, whether or not to use the reconstructed image data as the reference image data, wherein the determination unit calculates a peak signal-to-noise ratio (PSNR) from the reconstructed image data and the image data, and, if the PSNR is greater than or equal to a predetermined threshold, determines to use the reconstructed image data as the reference image data.

The present invention according to another aspect of preferable embodiments relates to a moving image encoding apparatus which can select an arbitrary reference image, comprising, a first image transformation unit adapted to transform image data into a first image information based on an intra-frame prediction and an inter-frame prediction, a second image transformation unit adapted to inverse transform the first image information into reconstructed image data, a determination unit adapted to determine, based on a calculation concerning an image degradation of the reconstructed image data in relation to the image data, whether the reconstructed image data is suitable as the reference image data, and a motion detection unit adapted to generate a motion vector using the reconstructed image data determined to be suitable by the determination unit.

Further features of the present invention will become apparent from the following description of exemplary embodiments, with reference to the attached drawings.

DESCRIPTION OF THE EMBODIMENTS

Following is a description of preferred embodiments of the present invention, with reference to the attached drawings.

First Embodiment

Following is a description of the configuration of a moving image encoding apparatus corresponding to the first embodiment of the present invention. Such a moving image encoding apparatus may be achieved as a hardware logic circuit, programming a processing module such as a DSP, an ASIC, or an FPGA. Such a moving image encoding apparatus may also be achieved by software executing a computational element of a CPU or the like.

Figure 1:
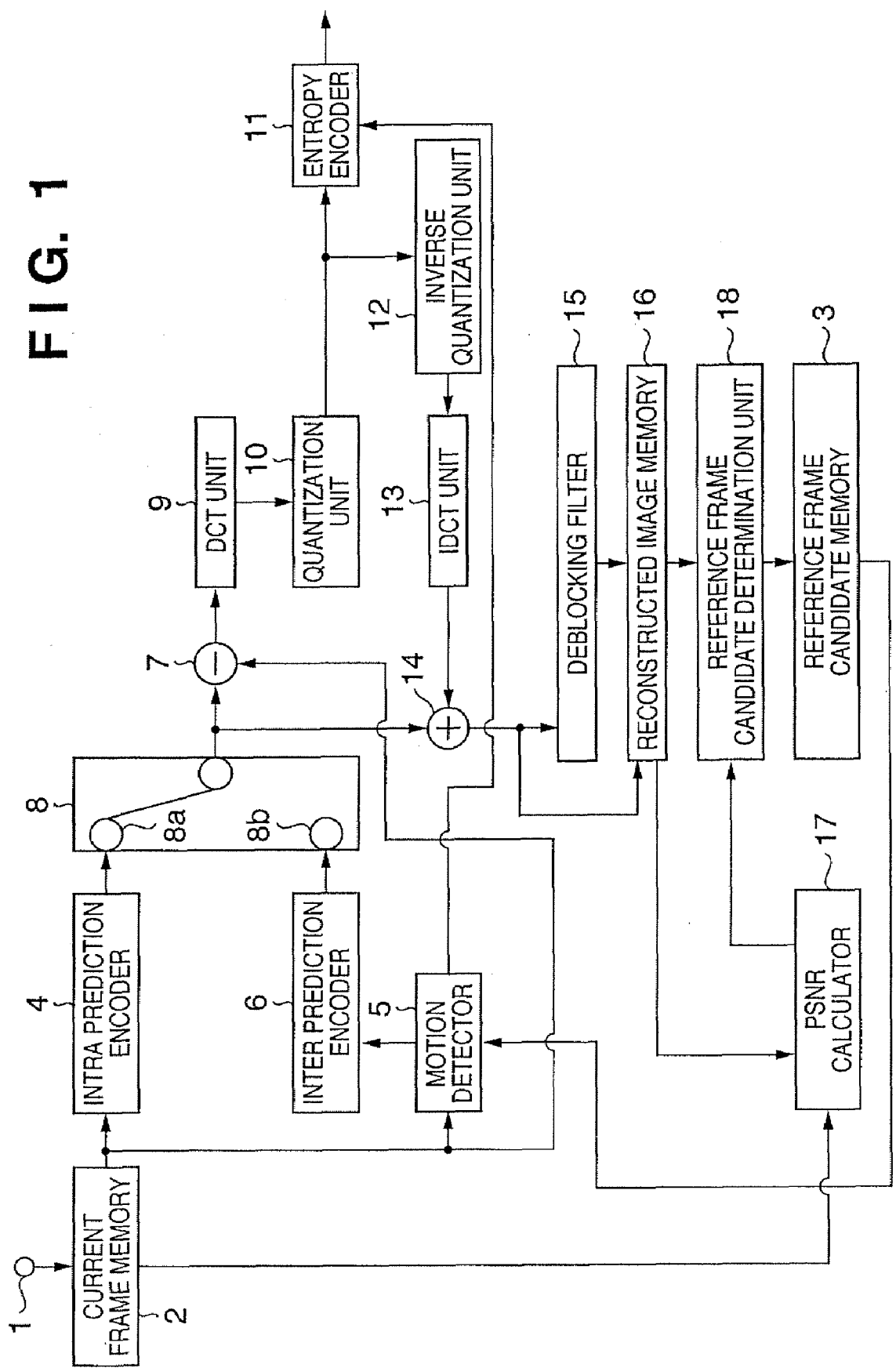
FIG. 1 is a block diagram illustrating an example of the configuration of a moving image encoding apparatus corresponding to a first embodiment of the present invention.
Figure 2:
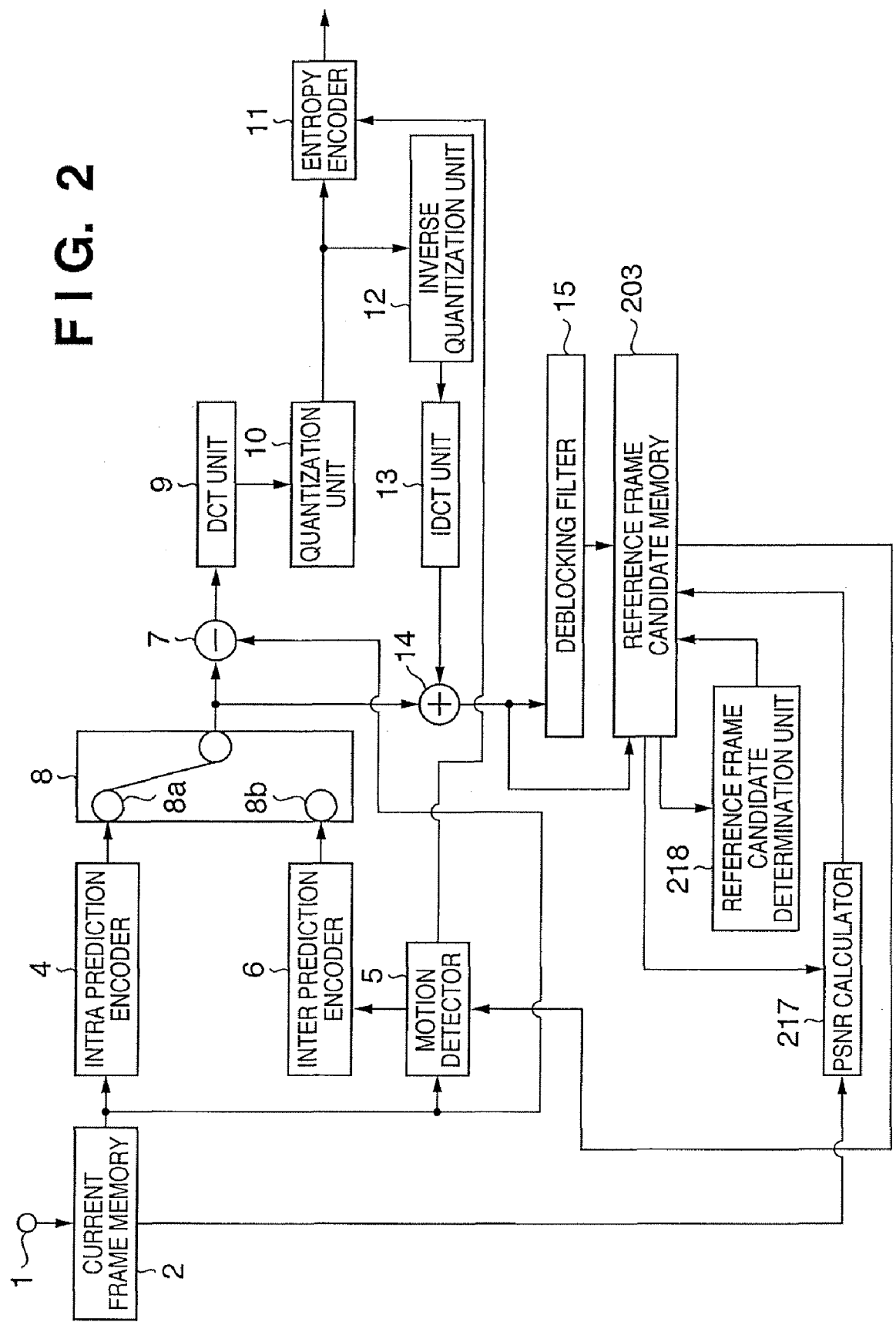
FIG. 2 is a block diagram illustrating an example of the configuration of a moving image encoding apparatus corresponding to a second embodiment of the present invention.

In FIG. 1, a current image data is inputted from an image input unit 1. A current frame memory 2 temporarily stores the current image data that is inputted from the image input unit 1. A reference frame candidate memory 3 stores reconstructed image data upon which a block boundary correction, to be described hereinafter, is performed, in order to use the reconstructed image data as a reference image for a prediction image information. The reference frame candidate memory 3 is capable of storing a plurality of the reconstructed image data.

An intra prediction encoder 4 divides the image data that is currently stored in the current frame memory 2 into a predetermined block unit, predicts image data of each block from a pixel on a periphery of the block, and generates the prediction image information.

A motion detector 5 divides the inputted current image data into a predetermined block unit, performs a motion detection processing that detects a position within each block that possesses a strong correlation with an arbitrary reference frame candidate, and detects difference data of the position as an interframe motion information. An inter prediction encoder 6 performs motion compensation that generates the prediction image information of the current image data, in accordance with the motion information that is given by a reference frame and the motion detector 5.

A subtracter 7 performs a prediction image information subtraction, as described hereinafter, and a switching unit 8 selects the prediction image information. A discrete cosine transform (DCT) unit 9 performs an integer orthogonal transformation on the image difference data, and a quantization unit 10 performs quantization processing using a prescribed quantization scale on the transformation coefficient that has undergone the integer orthogonal transformation. An entropy encoder 11 performs entropy encoding on the quantized transformation coefficient for data compression.

An inverse quantization unit 12 performs a inverse quantization processing on the quantized transformation coefficient, and an inverse discrete cosine transform (IDCT) unit 13 performs inverse integer orthogonal transformation that restores the inverse quantized transformation coefficient to the original image data space. An adder 14 adds the prediction image information, to be described hereinafter, to the image difference data that has been restored to the original image data space.

A deblocking filter unit 15 performs a deblocking processing on the image data that is reconstructed using the prediction image information, that compensates for a discontinuity in the prescribed block unit boundary data. A reconstructed image memory 16 stores the image data that is reconstructed using the prediction image information.

A PSNR calculator 17 compares pre-encoding image data inputted from the current frame memory 2 and the reconstructed image data inputted from the reconstructed image memory 16, and calculates a peak signal-to-noise ratio, or PSNR, which serves as an index of a degree of image degradation. Based on the PSNR value thus calculated, a reference frame candidate determination unit 18 determines whether or not the image data that is reconstructed using the prediction image information is a suitable reference frame candidate image.

Encoding processing is performed as follows within such a moving image encoding apparatus: a subtraction of the prediction image information from the image data to be encoded that is inputted from the image input unit 1 is performed using the subtracter 7, and difference data between the prediction image information and the image data to be encoded that is inputted from the image input unit 1 is generated. The DCT unit 9 performs an integer orthogonal transformation on the difference data, and orthogonally transforms a regular image space to a transformation coefficient space with increased energy concentration.

The transformation coefficient data of the difference data obtained via the integer orthogonal transformation is quantized by the quantization unit 10, in a prescribed quantizing step, and corresponding to the orthogonal transformation element. The quantized transformation coefficient data is encoded and compressed by the entropy encoder 11, which further multiplexes, compresses, and encodes a frame number identifier that is referenced in inter encoding, which will be described hereinafter.

Following is a description of a generation process of prediction image information. The prediction image information can be generated based on an intra-frame prediction encoding that generates the prediction image information using only the data of the current image frame at time of input, or an inter-frame prediction encoding that generates the prediction image information using data from an image frame other than the current image frame.

Following is a description of the intra-frame prediction encoding, wherein the process is closed within the inputted image. The inverse quantization unit 12 is used to reconstruct the transformation coefficient that was quantized in the quantization unit 10. The IDCT unit 13 is used to restore the reconstructed transformation coefficient to the original image data space, which is reconstructed as the difference data between the inputted image data and the prediction image information. The reconstructed image data of the inputted image may be obtained by using the adder 14 to add the prediction image information to the reconstructed difference data. The reconstructed image data at such point in time will result in an image that is slightly degraded from the original inputted image data, however, as a consequence of prediction information error or error in quantization processing.

The reconstructed image data is stored in the reconstructed image memory 16. The reconstructed image data that is stored in the reconstructed image memory 16 is supplied to the intra prediction encoder 4 via a path (not shown), and is used, on a prescribed block unit basis, to predict a value of a pixel within another block within the identical image frame. The predicted value obtained herein is transmitted to the switch 8 as the prediction image information. By way of a controller (not shown), the switch 8 switches the prediction image information that is output to the subtracter 7 and the adder 14, according to prediction method for the prediction image information. The switch is connected at 8a when the intra-frame prediction encoding is used, and the prediction image information that is calculated using the intra-frame prediction encoding is output to the subtracter 7 and the adder 14.

Figure 3:
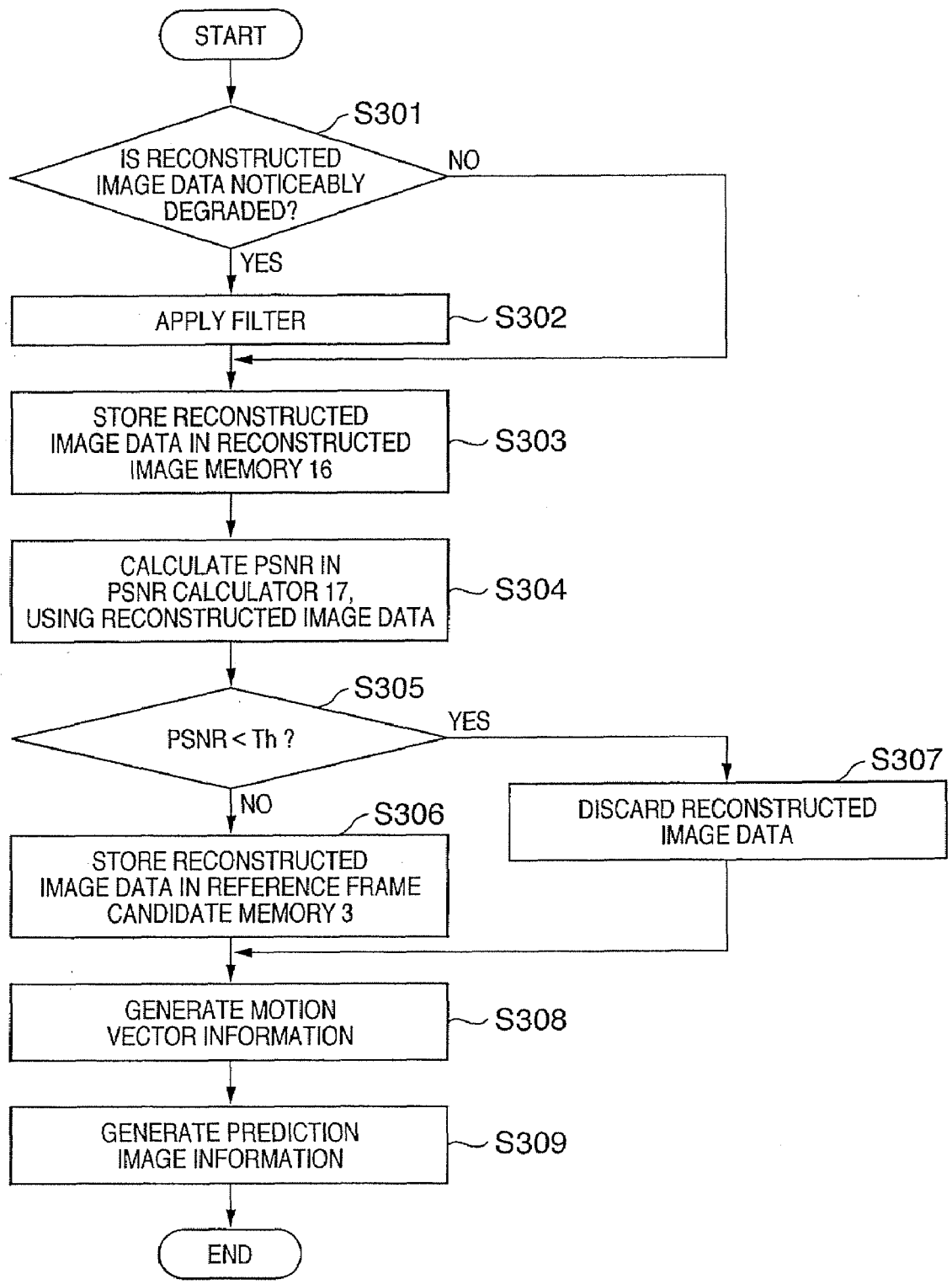
FIG. 3 is a flowchart illustrating an example of a process pertaining to a moving image encoding apparatus corresponding to the first embodiment of the present invention.

Following is a description of the inter-frame prediction encoding that generates the prediction image information using an image frame other than the inputted current image frame as the reference image, with reference to the flowchart in FIG. 3. The process that is performed from the inputting of the current image frame to the adder 14 is similar to the description of the intra-frame prediction encoding, and accordingly, the description thereof is omitted to avoid redundancy.

In step S301, a determination is made as to whether or not the reconstructed image data that is obtained with the adder 14 suffers from significant degradation. The determination is performed by a controller (not shown). If the reconstructed image data degradation is determined to be significant ("YES" at step S301), the process proceeds to step S302, wherein a filtering processing is performed using the deblocking filter unit 15 on the reconstructed image data, and the process proceeds to step S303.

As previously described, image data that is reconstructed by the adder 14 will be degraded from the inputted image. Image data that is processed in each process on a prescribed block unit basis is prone to an occurrence of data discontinuity at a block boundary, and thus, has a particularly strong probability of being image identified as block distortion.

The deblocking filter unit 15 performs a prescribed filtering processing on pixel data that is adjacent to a block boundary in order to eliminate the data discontinuity at the block unit boundary, thus keeping block boundary data discontinuity under control.

Such filter processing is optional, however, and it is preferable to skip the processing when it is determined that the reconstructed image data degradation is sufficiently low. A determination is thus made in step S301 as to whether or not to route the reconstructed image data through the deblocking filter unit 15. An instance of high data degradation would be an instance in which sufficient performance cannot be obtained owing to violent movement or transformation, even though motion compensated prediction is possessed, for example.

If it is determined in step S301 that the reconstructed image data degradation is low ("NO" at step S301), the process proceeds to step S303.

In step S303, either the reconstructed image data that has filtering processing performed thereon, or the reconstructed image data that has not been processed, is stored in the reconstructed image memory 16. In step S304, the reconstructed image data that has been stored in the reconstructed image memory 16 is transmitted to the PSNR calculator 17, and the PSNR is calculated. The PSNR calculation is performed on a frame unit basis according to the embodiment.

The PSNR is calculated with Equation 1, following, using the reconstructed image data from the reconstructed image memory 16 and the current image data from the current frame memory 2:

$$PSNR = 10\log_{10} \frac{N \times M \times T^2}{\sum_{i=0}^{N}\sum_{j=0}^{M} \{p(i,j) - p'(i,j)\}^2} \quad \text{Equation 1}$$

N and M represent a vertical and horizontal numbers of pixels of the image. p(i, j) represents a pixel value at a position (i, j) in the current image data, and p'(i, j) represents a pixel value at a position (i, j) in the reconstructed image data. T represents a number of gradation in the image minus one, i.e., if an image has eight bits per pixel, then T=255.

Thus calculated, the PSNR value is transmitted to the reference frame candidate determination unit 18, which performs a comparison between a prescribed threshold "Th" and the PSNR value in step S305. The threshold "Th" may preconfigured to 30 (dB) or other value considered to be a working value of the image, for example. To take into account a circumstance wherein almost all of the PSNR of the reconstructed image does not reach 30 (dB), it is permissible to take a threshold that is derived from the average value of the PSNR of the reconstructed image, while constantly updating the average value of the PSNR of the reconstructed image. In such circumstance, if the PSNR is below the threshold Th ("YES" at step S305), the process proceeds to step S307. If, on the other hand, the PSNR is at or above the threshold Th ("NO" at step S305), the process proceeds to step S306.

In step S306, a determination is made that the reconstructed image data is suitable as the reference frame, the reconstructed image data is stored in the reference frame candidate memory 3, and the process proceeds to step S308. On the other hand, an image in which a cut change or a strobe or other flash has occurred will have a reduced correlation with a surrounding image, which will reduce the calculated PSNR value. If the PSNR is below the threshold Th, it will be treated as such an image in which a cut change or the like occurs according to the embodiment. That is, in step S307, a determination is made that the reconstructed image data is not suitable as the reference frame, the reconstructed image data is discarded, and the process proceeds to step S308.

In such fashion, the reconstructed image data that is unsuitable as the reference frame, owing to poor image quality, is not registered as the reference frame candidate, and thus, it is possible to maintain a high level of encoding efficiency within the moving image encoding apparatus, even if there are a small number of frames that might be usable as reference.

In step S308, generation of motion vector information is performed using the motion detector 5. More specifically, the inputted current image data is divided into a prescribed block unit, and a position is searched for that has a strong correlation with a plurality of reference frame candidates that are stored in the reference frame candidate memory 3. The motion vector information is calculated in accordance with the position that is determined to have the strongest correlation and a position of a block within the current image data that is targeted for processing, and the motion vector information is transmitted to the inter prediction encoder 6 and the entropy encoder 11. Simultaneously, the identifier information of the reference frame that was used in the generation of the motion vector information is also transmitted to the inter prediction encoder 6 and the entropy encoder 11.

The inter prediction encoder 6 obtains the relevant reconstructed image data from the reference frame candidate memory 3, in accordance with the identifier information of the reference frame. In step S309, the current image data prediction image information is generated in accordance with the obtained reconstructed image data and the motion vector information that was obtained from the motion detector 5.

Inter-frame prediction encoding differs from intra-frame prediction encoding in that the former references an image frame that differs from the current image data and creates the prediction image information. The inter prediction encoder 6 is connected to 8b at the switch 8, the generated prediction image information is sent to the subtracter 7 or the adder 14, and used to generate difference data and the reconstructed image data.

It is thus possible to use PSNR to determine image quality of the reconstructed image data and exclude a frame in advance from the reference frame candidates that has weak correlation with another frame. Consequently, performance of a motion vector search for a reference frame candidate with a low degree of encoding efficiency is done away with, thus allowing the offering of a moving image encoding apparatus or other device that possess a high degree of encoding efficiency, even if there are a small number of reference frame candidates.

Second Embodiment

Following is a description of a moving image encoding apparatus configuration corresponding to a second embodiment of the present invention. Such a moving image encoding apparatus may be achieved as a hardware logic circuit, programming a processing module such as a DSP, an ASIC, or an FPGA. Such a moving image encoding apparatus may also be achieved by software executing a computational element of a CPU or the like.

While the moving image encoding apparatus according to this embodiment possesses a configuration that is nearly the same as the apparatus according to the first embodiment, it differs in that it possesses a reference frame candidate memory 203, a PSNR calculator 217, and a reference frame candidate determination unit 218, in place of the reconstructed image memory 16, the PSNR calculator 17, the reference frame candidate determination unit 18, and the reference frame candidate memory 3. Operation of each unit other than the reference frame candidate memory 203, the PSNR calculator 217, and the reference frame candidate determination unit 218 are similar to the first embodiment, and a description thereof is accordingly omitted.

Figure 4:
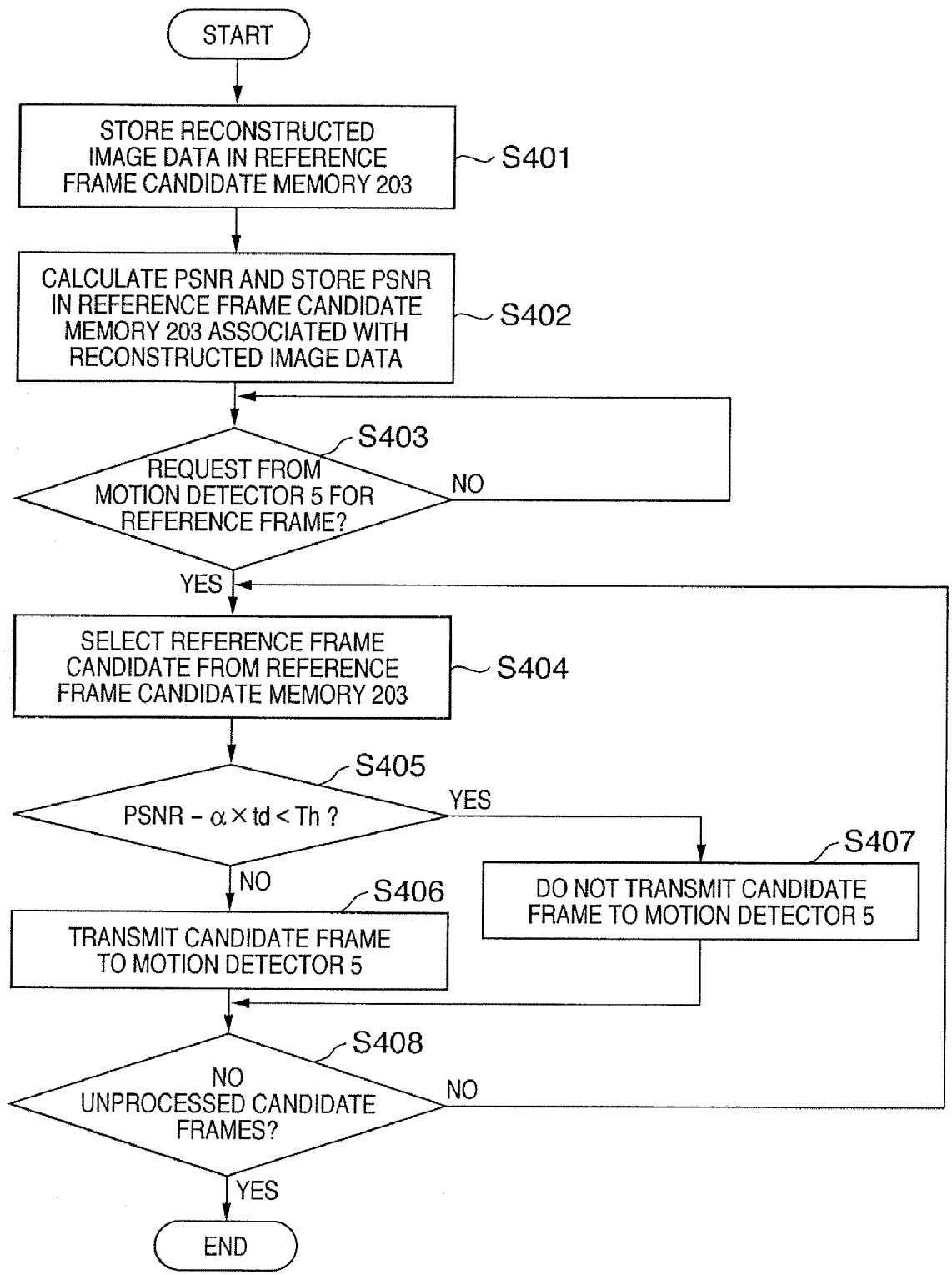
FIG. 4 is a flowchart depicting an example of a process pertaining to a moving image encoding apparatus corresponding to the second embodiment of the present invention.

The process according to this embodiment will be described with reference to FIG. 4. In step S401, either the reconstructed image data obtained with the adder 14 or the data processed by the deblocking filter unit 15 is stored in the reference frame candidate memory 203. The reconstructed image data is transmitted to the PSNR calculator 217.

In step S402, the PSNR calculator 217 uses the Equation 1 to calculate the PSNR, using the image data inputted from the current frame memory 2 and the reconstructed image data inputted from the reference frame candidate memory 203. The PSNR value thus calculated stored in the reference frame candidate memory 203 associated with the reconstructed image data.

In step S403, a determination is made as to whether or not a request for a reference frame is made by the motion detector 5 to the reference frame candidate memory 203. If the request for the reference frame has been made ("YES" at step S403), the process proceeds to step S404. If no such request is received, the process goes into standby mode until the request is received.

In step S404, reference frame candidates in the reference frame candidate memory 203 are respectively selected one by one. In step S405, a PSNR−α×td is calculated for the candidate frame that was selected in step S404, which is compared to the threshold Th. Herein, α is a prescribed constant, and Th is the prescribed threshold. It is possible to configure the actual value of the threshold in a manner similar to the first embodiment. Note also that td represents a difference between a frame number, i.e., a display sequence, of the selected candidate frame, and a frame number of the current image frame.

If PSNR−α×td<Th is not true ("NO" at step S405), the process proceeds to step S406. If, on the other hand, PSNR−α×td<Th is true ("YES" at step S405), the process proceeds to step S407.

In step S406, the candidate frame is transmitted to the motion detector 5 as being a suitable reference frame. In step S407, on the other hand, the candidate frame is not transmitted to the motion detector 5, as it is not a suitable reference frame. In step S408, a determination is made as to whether or not an unprocessed frame exists in the reference frame candidate memory 203. If there is no unprocessed frame therein ("YES" at step S408), the process terminates. If, on the other hand, there is an unprocessed frame therein ("NOT" at step S408), the process returns to step S404, and the determination processing in step S405 is performed on the unprocessed frame as a candidate frame.

The motion detector 5 performs generation of motion vector information, in accordance with the reference frame that is selected and transmitted as per the foregoing.

It is thus possible to establish whether or not the reconstructed image data should be used as the reference frame, taking into account the temporal distance from the current image frame that is targeted for processing to the reference frame candidate, in addition to the mere image quality. Consequently, it is possible to exclude from the reference frame a frame that is not suitable because it is temporally distant, despite having superior image quality, and thus, it is possible to maintain encoding efficiency at a high level even with a small number of reference frames.

Whereas the reconstructed image data is recorded without condition in the reference frame candidate memory 203 according to this embodiment, it would also be permissible to perform an image quality assessment based on the PSNR and exclude the reconstructed image data with extremely poor image quality from the reconstructed image data to be saved, as with the first embodiment. In such circumstance, it would be possible to assess only the image stored in the reference frame candidate memory 203 as to whether or not it is suitable as a reference frame, following the process depicted in the flowchart in FIG. 4.

The embodiments described deriving the PSNR on a frame unit basis. It is permissible, however, without restriction thereto, to calculate the PSNR on a basis of a block unit into which the image is divided, for example, on a macro-block unit basis, and determine on a per macro-block unit basis whether to use as the reference frame or not.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-044299, filed Feb. 21, 2006, which is hereby incorporated by reference herein in its entirety.

What is claimed is:

1. A moving image encoding apparatus which selects a reference image and performs a prediction encoding by using a selected reference image, said apparatus comprising:

a first image transformation unit adapted to transform image data corresponding to a current image into first image information, with reference to reference image data;

a second image transformation unit adapted to inverse transform the first image information into reconstructed image data;

a determination unit adapted to determine whether to use the reconstructed image data as new reference image data for subsequent prediction encoding or to discard the reconstructed image data;

a calculator adapted to calculate, using the image data and the reconstructed image data, a peak signal-to-noise ratio (PSNR) indicating a degree of image degradation between the reconstructed image data and the image data; and a storage unit adapted to store the reconstructed image data, wherein, if a value of the PSNR is greater than or equal to a predetermined threshold, then said determination unit determines to use the reconstructed image data as the new reference image data, and wherein said determination unit sets a predetermined value which varies according to frame distance between the image data and the reconstructed image data stored in the storage unit, and determines to use the reconstructed image data as the new reference image data when a difference between the value of the PSNR and the predetermined value is greater than or equal to the predetermined threshold.

2. The moving image encoding apparatus according to claim 1, wherein said first image transformation unit comprises:

(a) an orthogonal transformation processing unit adapted to perform an orthogonal transformation on difference data between prediction image data based on the reference image data and the image data; and (b) a quantization unit adapted to quantize a result of the orthogonal transformation to generate the first image information, and wherein said second image transformation unit comprises:

(a) an inverse-quantization unit adapted to inverse-quantize the first image information;

(b) an inverse-orthogonal transformation unit adapted to inverse-orthogonal transform a result of the inverse-quantization; and (c) a generation unit adapted to generate the reconstructed image data from a combination of a result of the inverse-orthogonal transformation and the prediction image data.

3. A moving image encoding apparatus which selects a reference image and performs a prediction encoding by using a selected reference image, said apparatus comprising:

a first image transformation unit adapted to transform image data corresponding to a current image into a first image information based on at least one of an intra-frame prediction and an inter-frame prediction;

a second image transformation unit adapted to inverse transform the first image information into reconstructed image data;

a calculator adapted to calculate, using the image data and the reconstructed image data, a peak signal-to-noise ratio (PSNR) indicating a degree of image degradation between the reconstructed image data and the image data;

a determination unit adapted to determine, based on a value of the PSNR calculated by said calculator, whether to use the reconstructed image data as new reference image data for subsequent prediction encoding or to discard the reconstructed image data;

a motion detection unit adapted to generate a motion vector using the reconstructed image data determined to be used by said determination unit; and a storage unit adapted to store the reconstructed image data, wherein said determination unit sets a predetermined value which varies according to frame distance between the image data and the reconstructed image data stored in the storage unit, and determines to use the reconstructed image data as the new reference image data when a difference between the value of the PSNR and the predetermined value is greater than or equal to a predetermined threshold.

4. A control method of a moving image encoding apparatus selects a reference image and performs a prediction encoding by using a selected reference image, said method comprising:

a first image transformation step of transforming image data corresponding to a current image into first image information, with reference to reference image data;

a second image transformation step of inverse transforming the first image information into reconstructed image data;

a determination step of determining whether to use the reconstructed image data as new reference image data for subsequent prediction encoding or to discard the reconstructed image data; and a calculation step of calculating, using the image data and the reconstructed image data, a peak signal-to-noise ratio (PSNR) indicating a degree of image degradation between the reconstructed image data and the image data, wherein in said determination step, if a value of the PSNR is greater than or equal to a predetermined threshold, then it is determined to use the reconstructed image data as the new reference image data, wherein the moving image encoding apparatus comprises a storage unit adapted to store the reconstructed image data, and wherein in said method, said determination step sets a predetermined value which varies according to frame distance between the image data and the reconstructed image data stored in the storage unit, and determines to use the reconstructed image data as the new reference image data when a difference between the value of the PSNR and the predetermined value is greater than or equal to the predetermined threshold.

5. The control method of the moving image encoding apparatus according to claim 4, wherein said first image transformation step comprises:

(a) an orthogonal transformation step of performing an orthogonal transformation on difference data between prediction image data based on the reference image data, and the image data; and (b) a quantization step of quantizing a result of the orthogonal transformation to generate the first image information, and wherein said second image transformation step comprises:

(a) an inverse-quantization step of inverse-quantizing the first image information;

(b) an inverse-orthogonal transformation step of inverse-orthogonal transforming a result of the inverse-quantization; and (c) a generation step of generating the reconstructed image data from a combination of a result of the inverse-orthogonal transformation and the prediction image data.

6. A control method of a moving image encoding apparatus which selects a reference image and perform a prediction encoding by using a selected reference image, said method comprising:

a first image transformation step of transforming image data corresponding to a current image into first image information based on at least one of an intra-frame prediction and an inter-frame prediction;

a second image transformation step of inverse transforming the first image information into reconstructed image data;

a calculation step of calculating, using the image data and the reconstructed image data, a peak signal-to-noise ratio (PSNR) indicating a degree of image degradation between the reconstructed image data and the image data;

a determination step of determining, based on a value of the PSNR calculated in said calculation step, whether to use the reconstructed image data as new reference image data for subsequent prediction encoding or to discard the reconstructed image data; and a motion detection step of generating a motion vector using the reconstructed image data determined to be used in said determination step, wherein the moving image encoding apparatus comprises a storage unit adapted to store the reconstructed image data, and wherein in said method, said determination step sets a predetermined value which varies according to frame distance between the image data and the reconstructed image data stored in the storage unit, and determines to use the reconstructed image data as the new reference image data when a difference between the value of the PSNR and the predetermined value is greater than or equal to a predetermined threshold.

7. A non-transitory computer readable storage medium storing a computer program, wherein the computer program causes a computer to function as a moving image encoding apparatus which selects a reference image and performs a prediction encoding by using a selected reference image, said apparatus comprising:

a first image transformation unit adapted to transform image data corresponding to a current image into first image information, with reference to reference image data;

a second image transformation unit adapted to inverse transform the first image information into reconstructed image data;

a determination unit adapted to determine whether to use the reconstructed image data as new reference image data for subsequent prediction encoding or to discard the reconstructed image data;

a calculator adapted to calculate, using the image data and the reconstructed image data, a peak signal-to-noise ratio (PSNR) indicating a degree of image degradation between the reconstructed image data and the image data; and a storage unit adapted to store the reconstructed image data, wherein if a value of the PSNR is greater than or equal to a predetermined threshold, then said determination unit determines to use the reconstructed image data as the new reference image data, and wherein said determination unit sets a predetermined value which varies according to frame distance between the image data and the reconstructed image data stored in the storage unit, and determines to use the reconstructed image data as the new reference image data when a difference between the value of the PSNR and the predetermined value is greater than or equal to the predetermined threshold.

8. A non-transitory computer readable storage medium storing a computer program, wherein the computer program causes a computer to function as a moving image encoding apparatus which selects a reference image and performs a prediction encoding by using a selected reference image, said apparatus comprising:
a first image transformation unit adapted to transform image data corresponding to a current image into first image information based on at least one of an intra-frame prediction and an inter-frame prediction;
a second image transformation unit adapted to inverse transform the first image information into reconstructed image data;
a calculator adapted to calculate, using the image data and the reconstructed image data, a peak signal-to-noise ratio (PSNR) indicating a degree of image degradation between the reconstructed image data and the image data;
a determination unit adapted to determine, based on a value of the PSNR calculated by said calculator, whether to use the reconstructed image data as new reference image data for subsequent prediction encoding or to discard the reconstructed image data;
a motion detection unit adapted to generate a motion vector using the reconstructed image data determined to be used by said determination unit, and
a storage unit adapted to store the reconstructed image data,
wherein said determination unit sets a predetermined value which varies according to frame distance between the image data and the reconstructed image data stored in the storage unit, and determines to use the reconstructed image data as the new reference image data when a difference between the value of the PSNR and the predetermined value is greater than or equal to a predetermined threshold.

9. A moving image encoding apparatus which selects a reference image and performs a prediction encoding by using a selected reference image, said apparatus comprising:
a first image transformation unit adapted to transform image data corresponding to a current image into first image information, with reference to reference image data;
a second image transformation unit adapted to inverse transform the first image information into reconstructed image data;
a determination unit adapted to determine whether to use the reconstructed image data as new reference image data for subsequent prediction encoding or to discard the reconstructed image data; and
a calculator adapted to calculate, using the image data and the reconstructed image data, a peak signal to noise ratio (PSNR) indicating a degree of image degradation between the reconstructed image data and the image data, wherein, if a value of the PSNR is greater than or equal to a predetermined threshold, then said determination unit determines to use the reconstructed image data as the new reference image data, and
wherein said first image transformation unit comprises:
(a) an orthogonal transformation processing unit adapted to perform an orthogonal transformation on difference data between prediction image data based on the reference image data and the image data; and
(b) a quantization unit adapted to quantize a result of the orthogonal transformation to generate the first image information, and
wherein said second image transformation unit comprises:
(a) an inverse quantization unit adapted to inverse quantize the first image information;
(b) an inverse orthogonal transformation unit adapted to inverse orthogonal transform a result of the inverse quantization; and
(c) a generation unit adapted to generate the reconstructed image data from a combination of a result of the inverse orthogonal transformation and the prediction image data.

10. A moving image encoding apparatus which selects a reference image and performs a prediction encoding by using a selected reference image, said apparatus comprising:
a first image transformation unit adapted to transform image data corresponding to a current image into a first image information based on at least one of an intra frame prediction and an inter frame prediction;
a second image transformation unit adapted to inverse transform the first image information into reconstructed image data;
a calculator adapted to calculate, using the image data and the reconstructed image data, a peak signal to noise ratio (PSNR) indicating a degree of image degradation between the reconstructed image data and the image data;
a determination unit adapted to determine, based on a value of the PSNR calculated by said calculator, whether to use the reconstructed image data as new reference image data for subsequent prediction encoding or to discard the reconstructed image data; and
a motion detection unit adapted to generate a motion vector using the reconstructed image data determined to be used by said determination unit,
wherein said first image transformation unit comprises:
(a) an orthogonal transformation processing unit adapted to perform an orthogonal transformation on difference data between prediction image data based on the reference image data and the image data; and
(b) a quantization unit adapted to quantize a result of the orthogonal transformation to generate the first image information, and
wherein said second image transformation unit comprises:
(a) an inverse quantization unit adapted to inverse quantize the first image information;
(b) an inverse orthogonal transformation unit adapted to inverse orthogonal transform a result of the inverse quantization; and
(c) a generation unit adapted to generate the reconstructed image data from a combination of a result of the inverse orthogonal transformation and the prediction image data.

* * * * *